Feb. 11, 1930.  A. ZUR NIEDEN  1,747,022
WATER GAUGE FOR AUTOMOBILE RADIATORS
Filed Jan. 13, 1928

WITNESSES
Edw. Thorpe
A. L. Kitchin

INVENTOR
A. Z. Nieden
BY
ATTORNEY

Patented Feb. 11, 1930

1,747,022

UNITED STATES PATENT OFFICE

ALBRECHT zur NIEDEN, OF NEW YORK, N. Y.

WATER GAUGE FOR AUTOMOBILE RADIATORS

Application filed January 13, 1928. Serial No. 246,509.

This invention relates to water gauges, and particularly to an improved water gauge for use on automobile radiators, the object being to provide an improved structure for indicating the level of the water in a radiator.

Another object of the invention is to provide a gauge for automobile radiators, wherein means are presented which may be quickly applied to a radiator or quickly removed therefrom, and when in use, formed to present means for accurately showing the water level without interfering with the addition of a new supply of water.

A further object, more specifically, is to provide a gauge having a supporting plate and a floating member with signs thereon indicating the water level, the entire formation being such as to cover only part of the opening in the radiator and thereby permit water to be inserted while the gauge is in use.

In the accompanying drawing—

Figure 1:
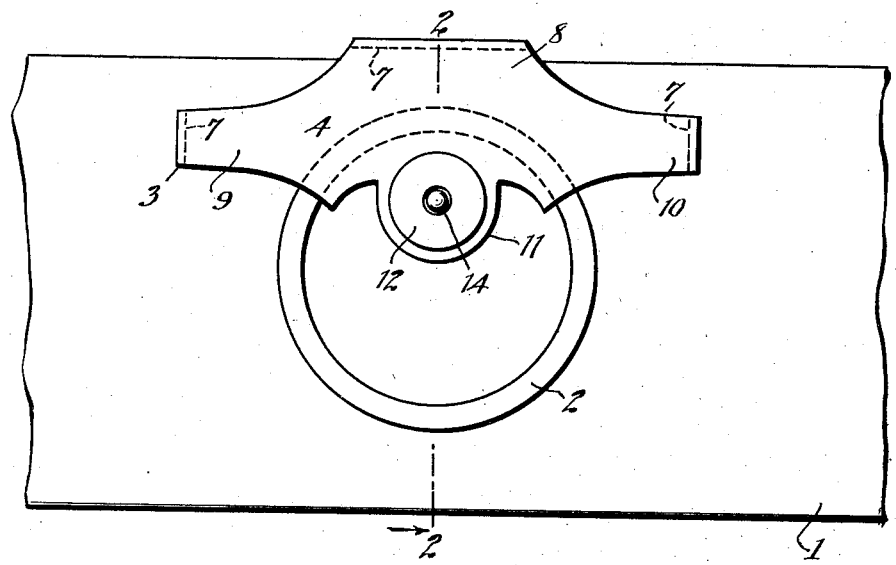
Figure 1 is a top plan view of part of a conventional radiator, together with an embodiment of the invention shown applied thereto.
Figure 2:
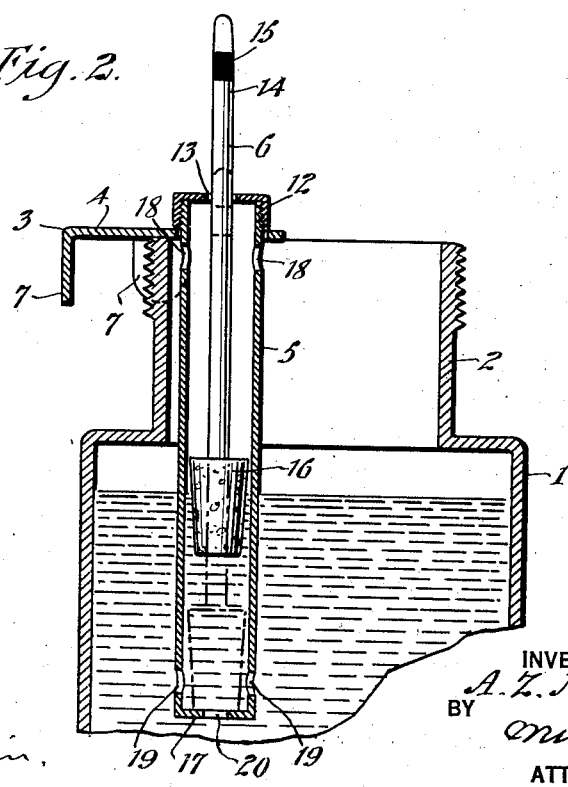
Figure 2 is a sectional view through Figure 1, approximately on line 2—2.

Referring to the accompanying drawing by numerals, 1 indicates an ordinary radiator for automobiles, said radiator having a filling neck 2 which is preferably threaded for receiving a cap. A gauge 3 is shown applied to the filling neck 2 and as illustrated in Figure 2, said gauge clearly shows the water level in the radiator. The device may be used for gauging the liquid level in other containers, but is particularly adapted for automobile radiators so that a proper supply of water may be added without causing an overflow.

In cold weather, anti-freezing liquids are added to the cooling liquid in the radiator, and it is, therefore, undesirable to cause the cooling water to overflow. In case the water overflows, some of this anti-freezing solution is lost and also in many cases, this solution injures the enamel on the automobile. By providing the gauge embodying the invention, water or anti-freezing solution may be added freely, and at the same time, the level of the liquid seen.

As shown in the drawing, the gauge includes a supporting plate 4, a guiding tube or well 5 and a float structure 6. The plate 4 is preferably a flat metal plate having a plurality of turned down lugs 7, there being a turned down lug 7 on each of the arms or radiating extensions 8, 9 and 10. Opposite the central lug 7 there is provided an apertured extension 11 through which the well or tube 5 extends. A cap 12 is screwed onto the upper end of the tube 5 and rests on the plate 4, whereby the tube 5 is properly supported. An aperture 13, slightly larger than the stem 14, is provided in cap 12, whereby stem 14 may freely move up and down through aperture 13. The stem 14 may be any kind of light wood or other material, as for instance very thin sheet metal. Near the upper end a band 15 is painted or otherwise applied to the stem 14, and when the liquid in the radiator is too low, this band is positioned below the cap 12 as shown in dotted lines in Figure 2. When this is the case, the float member 16 is resting on the bottom 17 of tube 5. The float member as shown, is a piece of cork, though it might be ordinary wood or hollow metal. Preferably the tube 5 is made of metal, though it could be made of some other material.

As indicated in Figure 2, the tube 5 is provided with a plurality of apertures 18 immediately below plate 4 and a plurality of apertures 19 near the bottom. In fact, there is one aperture 20 in the bottom member 17 whereby the liquid may freely flow into and out of the tube 5 and also the air may escape freely therefrom at the upper part, whereby the action of float 16 will be true. The parts are preferably made of a size that when the signal or indicating band 15 is slightly above cap 12, a sufficient supply of water is in the radiator. It is, of course, evident that more water could be supplied and, consequently, the stem 14 elevated to a greater extent. Also, if desired, additional bands could be provided, though ordinarily, one band is sufficient. The device is capable of being used in a comparatively dark place as well as in a light place. When used in a dark place, a person can feel of the upper end of the stem 14, and if it projects only a short distance, as for instance, about a half inch, the person will know that an additional supply of water is necessary. By slightly touching the upper end of stem 14 from time to time as water is being supplied, the person can tell when the same begins to rise, and after it has risen for a short distance, as for instance, an inch or a little more, the workman will know that a sufficient supply of water has been provided. The entire device is then quickly lifted out of the radiator and the cap or other covering member applied. By providing the plate 4 comparatively long and shaped as shown in the drawing, radiator filling necks 2 of different sizes may be accommodated and the gauge caused to operate in the same manner.

What I claim is:

1. A cover plate for supporting an indicator in the filling neck of an automobile radiator, comprising a flat plate adapted to rest on top of the upper edge of said neck so as to leave uncovered most of the neck, said plate being formed with a pair of laterally extending arms provided with depending members and a depending flange between said arms, said flange and depending members acting to hold the plate in proper position during the filling of the radiator.

2. A cover plate for supporting an indicator in the filling neck of an automobile radiator, comprising a body adapted to overlap part of the neck so as to leave uncovered most of the neck opening, whereby a filling member may be inserted for supplying the desired quantity of water, said body being formed with an opening for accommodating said indicator when the device is in use, a pair of laterally-extending supporting arms resting on top of said neck, and a depending lug for limiting the movement of the body in one direction.

Signed at New York in the county of New York and State of New York this 12th day of January, A. D. 1928.

ALBRECHT zur NIEDEN.